(12) United States Patent
Andersen et al.

(10) Patent No.: US 10,961,096 B1
(45) Date of Patent: Mar. 30, 2021

(54) METHOD OF USING BLOCKS AND WEDGES FOR TEMPORARILY SUPPORTING A PALLET HOLDING A LOAD TO BE MOVED VIA A PALLET JACK

(71) Applicants: Niel Andersen, Elk Grove Village, IL (US); William Pry, Chicago, IL (US)

(72) Inventors: Niel Andersen, Elk Grove Village, IL (US); William Pry, Chicago, IL (US)

(*) Notice: Subject to any disclaimer, the term of this patent is extended or adjusted under 35 U.S.C. 154(b) by 0 days.

(21) Appl. No.: 17/120,164

(22) Filed: Dec. 12, 2020

(51) Int. Cl.
*B66F 9/12* (2006.01)
*B66F 9/065* (2006.01)

(52) U.S. Cl.
CPC .............. *B66F 9/12* (2013.01); *B66F 9/065* (2013.01)

(58) Field of Classification Search
CPC .... B66F 9/06; B66F 9/065; B66F 9/12; B66F 5/00; B66F 17/003
USPC ............ 187/222, 237; 254/11; 414/619, 631
See application file for complete search history.

(56) References Cited

U.S. PATENT DOCUMENTS

| | | | | | |
|---|---|---|---|---|---|
| 3,525,501 | A | * | 8/1970 | Goetz | B62B 3/06 254/2 R |
| 4,615,533 | A | * | 10/1986 | Sewell | B62B 3/0618 280/43.12 |
| 2009/0183953 | A1 | * | 7/2009 | Ellington | B62B 3/0606 187/231 |

* cited by examiner

*Primary Examiner* — Glenn F Myers
(74) *Attorney, Agent, or Firm* — Steven Ivy P.C.

(57) ABSTRACT

A method of using simple blocks and wedges, designed to temporarily support a pallet, to create access for a pallet jack underneath the pallet, to enable a properly supported and balanced movement of the load resting on the pallet. The method utilizes two wedges, triangular in shape (each having an angled surface, a bottom surface and a hook), two blocks, rectangular in shape (each having two side walls and a hook), and a commercially-available pallet jack (manually or mechanically operated). The method enables the end-user to provide a temporary, balanced support of a pallet during the gradual increase or decrease in elevation of the pallet. This adjustment of the pallet's elevation, creates access for a pallet jack in the middle of the pallet, that was previously unavailable.

19 Claims, 12 Drawing Sheets

STEP 11

METHOD OF USING BLOCKS AND WEDGES FOR TEMPORARILY SUPPORTING A PALLET HOLDING A LOAD TO BE MOVED VIA A PALLET JACK

FIELD OF THE INVENTION

The present invention addresses the general field of load-moving equipment used in retail, warehousing, and product delivery operations.

BACKGROUND OF THE INVENTION

The United States Department of Transportation, and the report generated by the Bureau of Transposition Statistic shows that the U.S. freight transportation system carries enormous quantities (annual average exceeding 20 billion tons) of goods and raw materials to support economic and industrial activities all across the nation and to meet consumer demands. And most of this material, in its final stages of delivery, is moved on pallets by individuals using pallet jacks.

Some pallets have cutouts in the sides of the pallets, which are designed for forklift use only, but do not accommodate the manually-operated pallet jacks. Many pallets do not have side cutouts and/or notches, making movement of the loads attached to such pallets very difficult. For example, a pallet jack used to move a pallet is four feet long, this is insufficient support for pallets over six feet long, weighing over 600 lbs. Moving long, unbalanced, heavy pallets by hand requires a tremendous amount of force, the assistance of additional labor, or the separation of the freight and moving individual components.

The presented here method provides a solution to this problem. Specifically, the method enables the end-user to provide a temporary support of a pallet during the gradual increase or decrease in elevation of the pallet. This manipulation of the elevation of the pallet, creates access for a pallet jack in the middle of the pallet, that was previously unavailable. If properly executed, the method will ensure that the pallet, along with the load held on top of the pallet, rest on the forks of the pallet jack, in a fully supported and balanced position. The presented herein method will enable a delivery person to reduce the risk of injury, save time, and will eliminate the need for additional help.

The present invention takes into consideration a multitude of pallet designs, which differ in size and functionality. Specifically, the present invention may be utilized with (1) two way entry reversible type pallet; (2) two way entry close boarded no base board type pallet; (3) two way entry wing type pallet; (4) four way entry close boarded three base type pallet; (5) four way entry perimeter base type pallet; (6) four way entry wing type pallet; (7) four way entry close boarded perimeter base type pallet; (8) four way entry open boarded three base type pallet; as well as any variation of Australian, European, and North American Pallet, including but not limited to pallet designs sanction by the International Organization for Standardization and the Grocery Manufacturers Association.

SUMMARY OF THE INVENTION

The following information is intended to be a brief summary of the invention, and as such, said information shall not be used as the means of limiting the scope of the invention:

The present invention discloses a method of using blocks and wedges to temporarily support a pallet holding a load to be moved via pallet jack. Specifically, method utilizes two wedges, triangular in shape (each having an angled surface, a bottom surface and a hook), two blocks, rectangular in shape (each having two side walls and a hook), and a commercially-available pallet jack (manually or mechanically operated).

The method enables the end-user to provide a temporary support of a pallet during the gradual increase or decrease in elevation of the pallet. This manipulation of the elevation of the pallet, creates access for a pallet jack in the middle of the pallet, that was previously unavailable. If properly executed, the method will ensure that the pallet, along with the load held on top of the pallet, rest on the forks of the pallet jack, in a fully supported and balanced position.

The method incorporates twelve main steps: (1) lifting of the side of the pallet holding a load; (2) inserting wedges underneath the pallet; (3) inserting the pallet jack in the space created by the wedges, and lifting the pallet; (4) removing the wedges; (5) inserting the blocks underneath the pallet; (6) re-inserting the pallet jack underneath the pallet, enabling full engagement of the pallet forks, and lifting the pallet in a fully balanced position; (7) removing the blocks; and (8) moving the pallet to a desired location; (9) re-inserting the wedges underneath the pallet; (10) lowering the pallet jack and partially extracting it away from the pallet; (11) leaning the pallet enough to enable removal of the wedges; and (12) removal of the pallet jack, thereby completing the method of relocating the pallet holding the weigh.

BRIEF DESCRIPTION OF THE DRAWINGS

The components shown in the drawings are not to scale. In the interest of clarity, some of the components might be shown in a generalized form and could be identified utilizing commercial designations. All components, including its essential features, have been assigned reference numbers that are utilized consistently throughout the descriptive process outlined herein.

DESCRIPTIVE KEY

10—wedge
11—angled surface, wedge
12—bottom surface, wedge
13—hook, wedge
20—block
21—two side walls, block
22—hook, block
30—pallet jack
31—forks, pallet jack
32—stop plate, pallet jack
33—handle, pallet jack
40—pallet
41—top deckboard, pallet
42—bottom deckboard, pallet
43—first short side, pallet
44—second short side, pallet
45—long side, pallet
46—pallet jack notches, pallet
47—pallet jack openings, pallet
50—end-user

DETAILED DESCRIPTION OF THE PREFERRED EMBODIMENT

The following description references to the above-defined drawings and represents only an exemplary embodiment of the invention. It is foreseeable, and recognizable by those skilled in the art, that various modifications and/or substitutions to the invention could be implemented without departing from the scope and the character of the invention:

The present invention discloses a method of using blocks 20 and wedges 10 to temporarily support a pallet 40 holding a load to be moved via pallet jack 30. Both the wedges 10 and the blocks 20 could be manufactured from a wide variety of materials, including but not limited to wood, plastic, metal, paper, rubber, and various recycled materials.

The method enables the end-user 50 to provide a temporary, balanced support of the pallet 40 during the gradual increase or decrease in elevation of the pallet 40. This manipulation of the elevation of the pallet 40, creates access for a pallet jack 30 in the middle of the pallet, that was previously unavailable. Typically, the method will be utilized on large, and in some respects, oversized pallets 40. The method focuses on accomplishing two functions: (1) increase, via the pallet jack forks 31, in pallet's elevation; and (2) balance of the pallet 40 and its weights, on top of the pallet jack forks 31. Tests conducted by the Applicant show that to move a pallet 40 over six feet long, and weighing more than 600 pounds, three things are necessary: (1) a pallet jack 30; (2) at least two wedges 10; (3) and at least two blocks 20.

The defined herein method comprises of twelve main steps, which are sub-divided into specific functions, identified herein as functions A through U.

Figure 1:
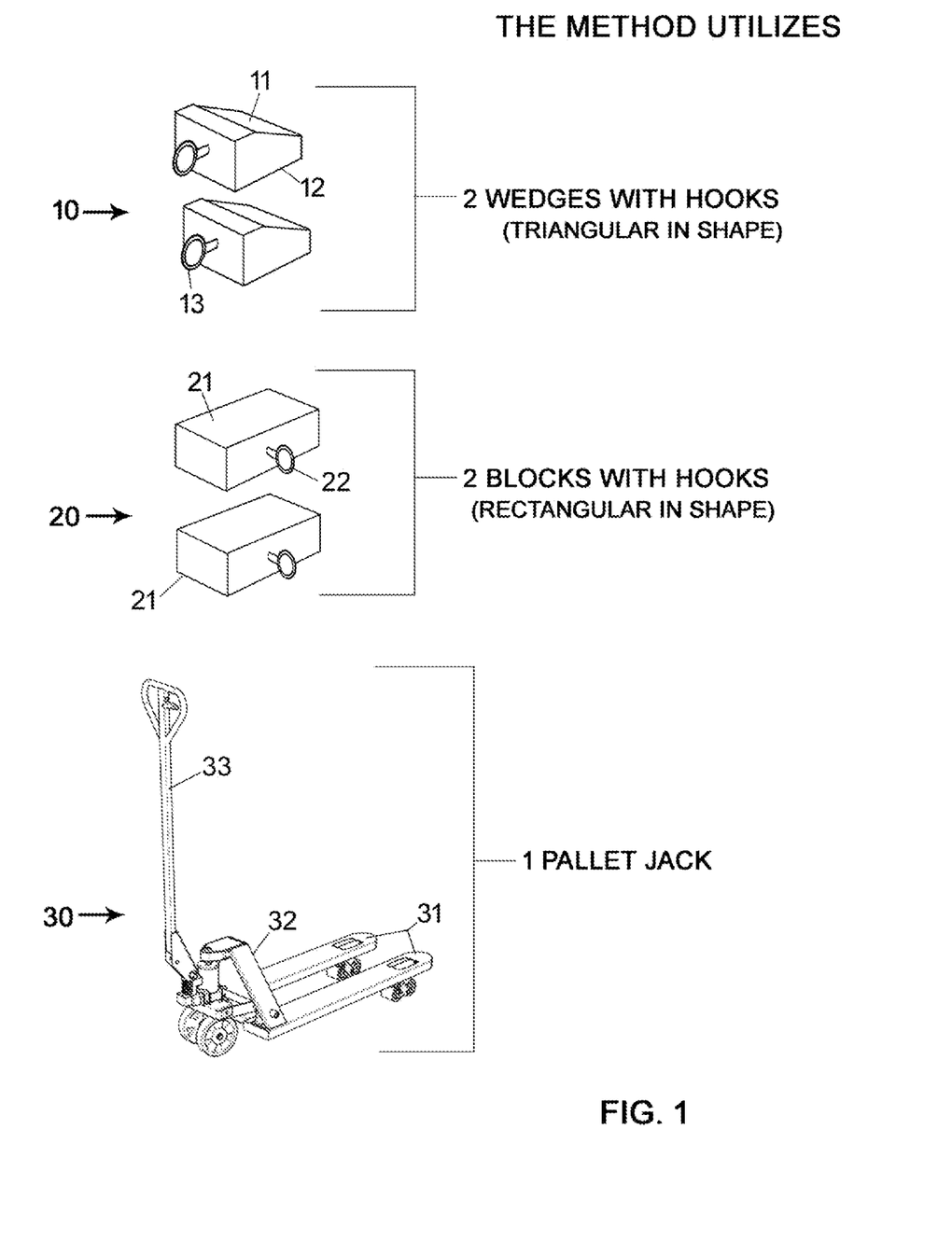
FIG. 1 provides a graphical summary of items necessary to implement the defined herein method; wherein said items include (1) a perspective view of two wedges, triangular in shape, with a single hook attached to each one of the wedges; (2) a perspective view of two blocks, rectangular in shape, with a single hook attached to each one of the blocks; (3) a perspective view of a commercially-available, hand-operated, pallet jack; in accordance with an exemplary embodiment of the present invention.
Figure 2:
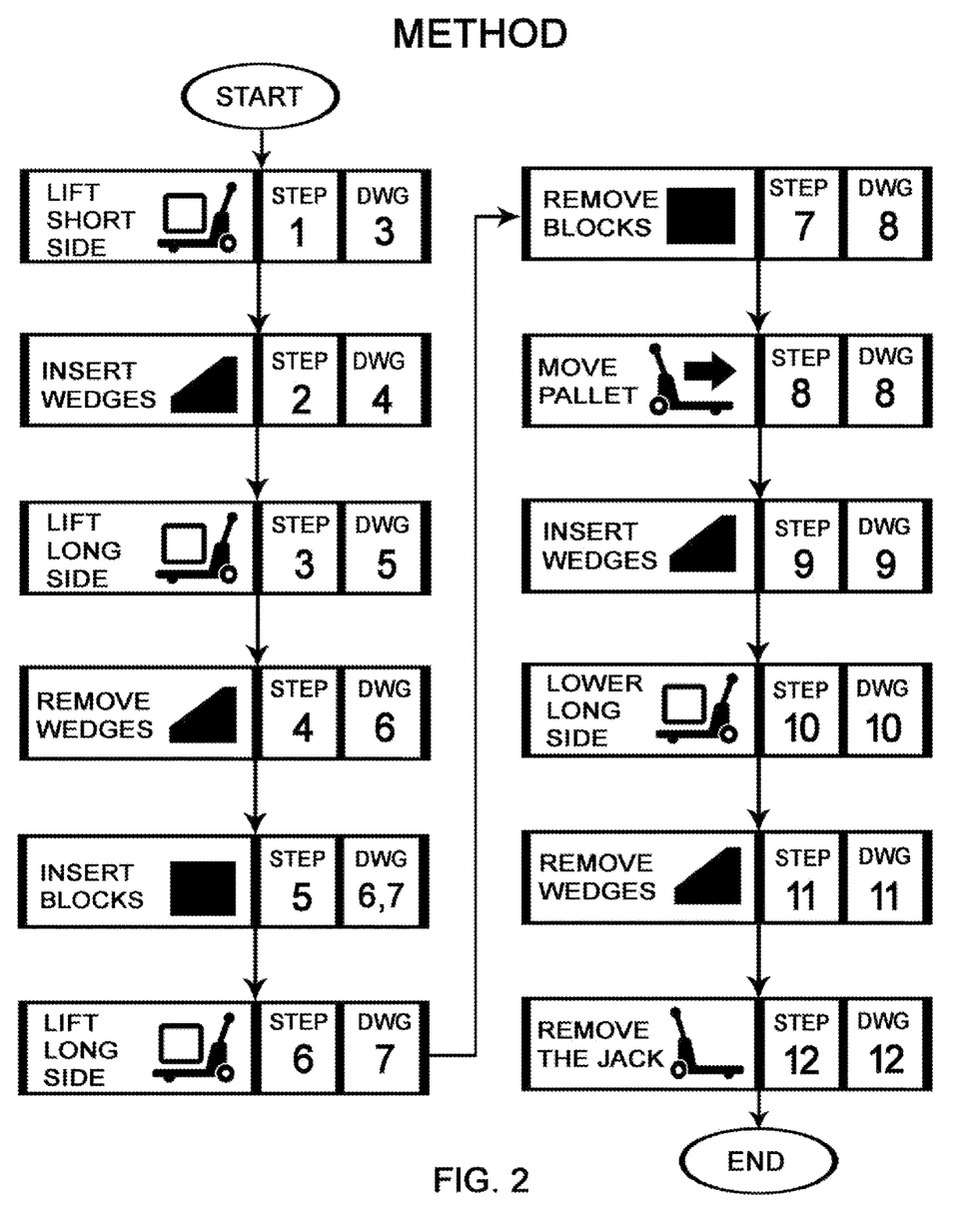
FIG. 2 is a diagram illustrating the steps undertaken during the application of the defined herein method of using blocks and wedges for temporarily supporting a pallet holding a load to be moved via a manually-operated pallet jack; in accordance with an exemplary embodiment of the present invention.

The function A, requires the end-user 50 to provide a pallet jack 30 having a stop plate 32 and forks 31 configured to lift or to lower a pallet 40; wherein the pallet 40 is comprising of a top deckboard 41, a bottom deckboard 42, a first short side 43, a second short side 44, and a long side 45. A second long side, thus the long side positioned opposite to the first long side, is also incorporated into the present design, however, to simplify the claimed process, only one side, thus the first long side is outlined in the claimed description of the invention.

Figure 3:
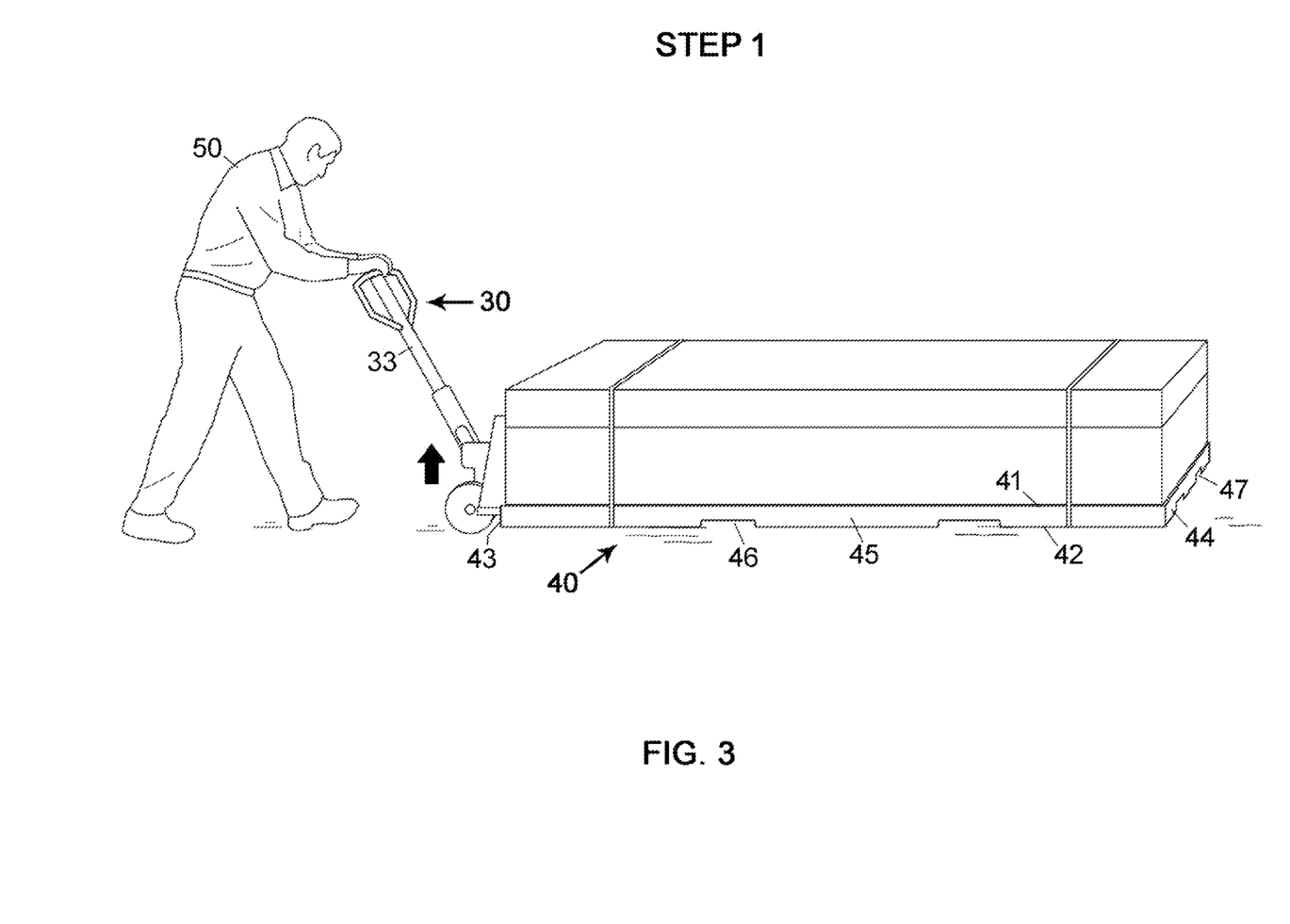
FIG. 3 is an illustration showing the first step in implementing the defined herein method, wherein the end-user is lifting the short end of a pallet, holding a load, to be moved using a manually-operated pallet jack; in accordance with an exemplary embodiment of the present invention.

The function B, requires the end-user 50 to use the forks 31 of the pallet jack 30 to lift the first short side 43 of the pallet 40.

The function C, requires the end-user 50 to provide two wedges 10, wherein each of the two wedges 10 comprises of an angled surface 11, a bottom surface 12, and a hook 13. The hooks 13 are firmly attached to the two wedges 10, allowing the end-user 50 to grab hold of the hooks 13 and retrieve the attached thereto wedges 10 from underneath the pallet 40.

Figure 4:
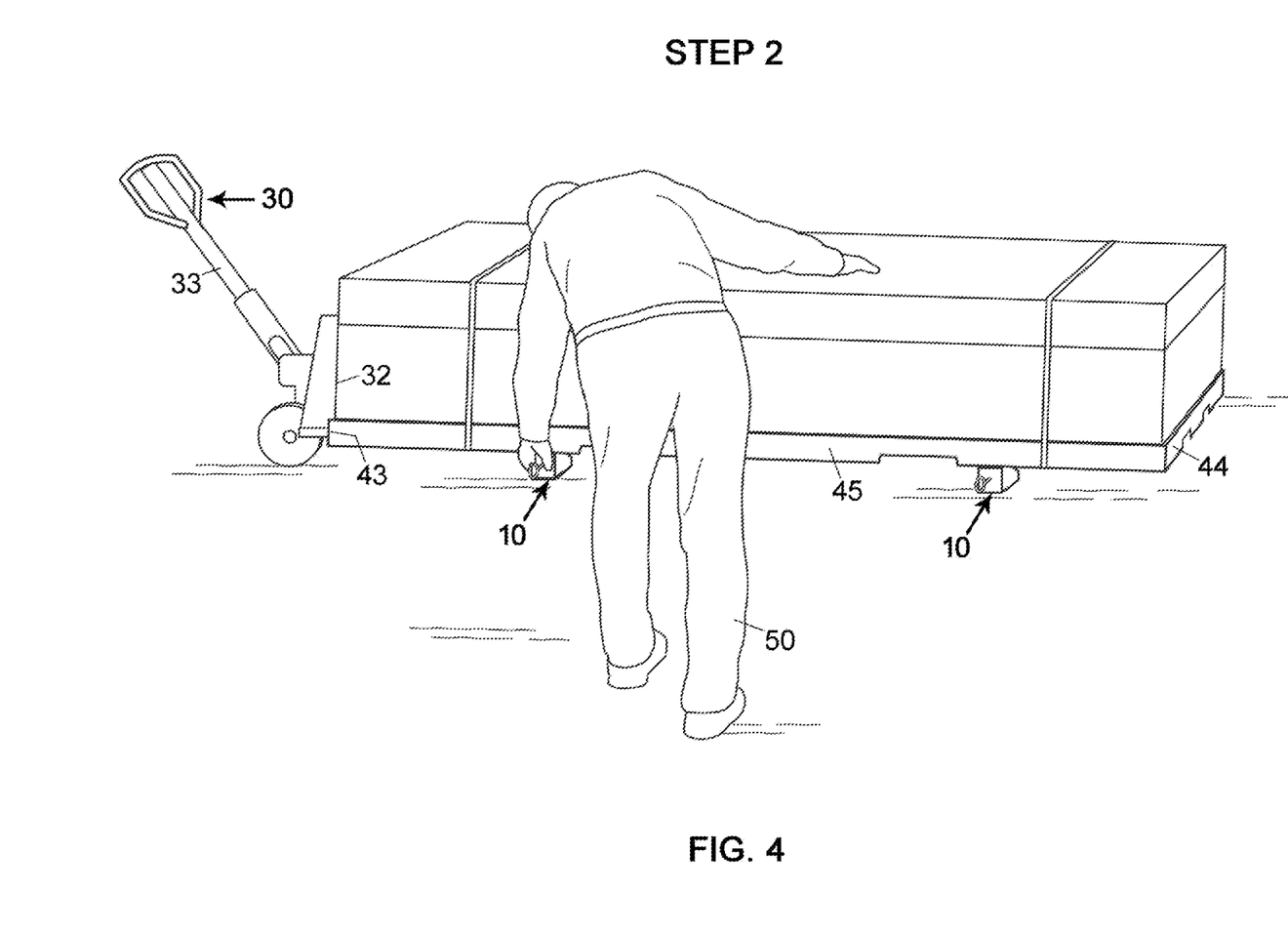
FIG. 4 is an illustration of the second step in implementing the defined herein method, showing the end-user inserting underneath the bottom deckboard, on the long side of the pallet, two wedges; wherein the one wedge is inserted near the first short side, and the second wedge is inserted near the second short side of the pallet; in accordance with an exemplary embodiment of the present invention.

The function D, requires the end-user 50 to insert the two wedges 10 on the long side 45 of the pallet 40 and underneath the bottom deckboard 42, so that one of the two wedges 10 is disposed near the first short side 43, and one of the two wedges is disposed near the second short side 44 of the pallet 40.

The function E, requires the end-user 50 to configure each of the two wedges 10 so the bottom surface 12 is touching the ground, the angled surface 11 is touching the bottom deckboard 42 of the pallet 40, and the hooks 13, attached to each of the wedges 10, are easily accessible to an end user 50.

Figure 5:
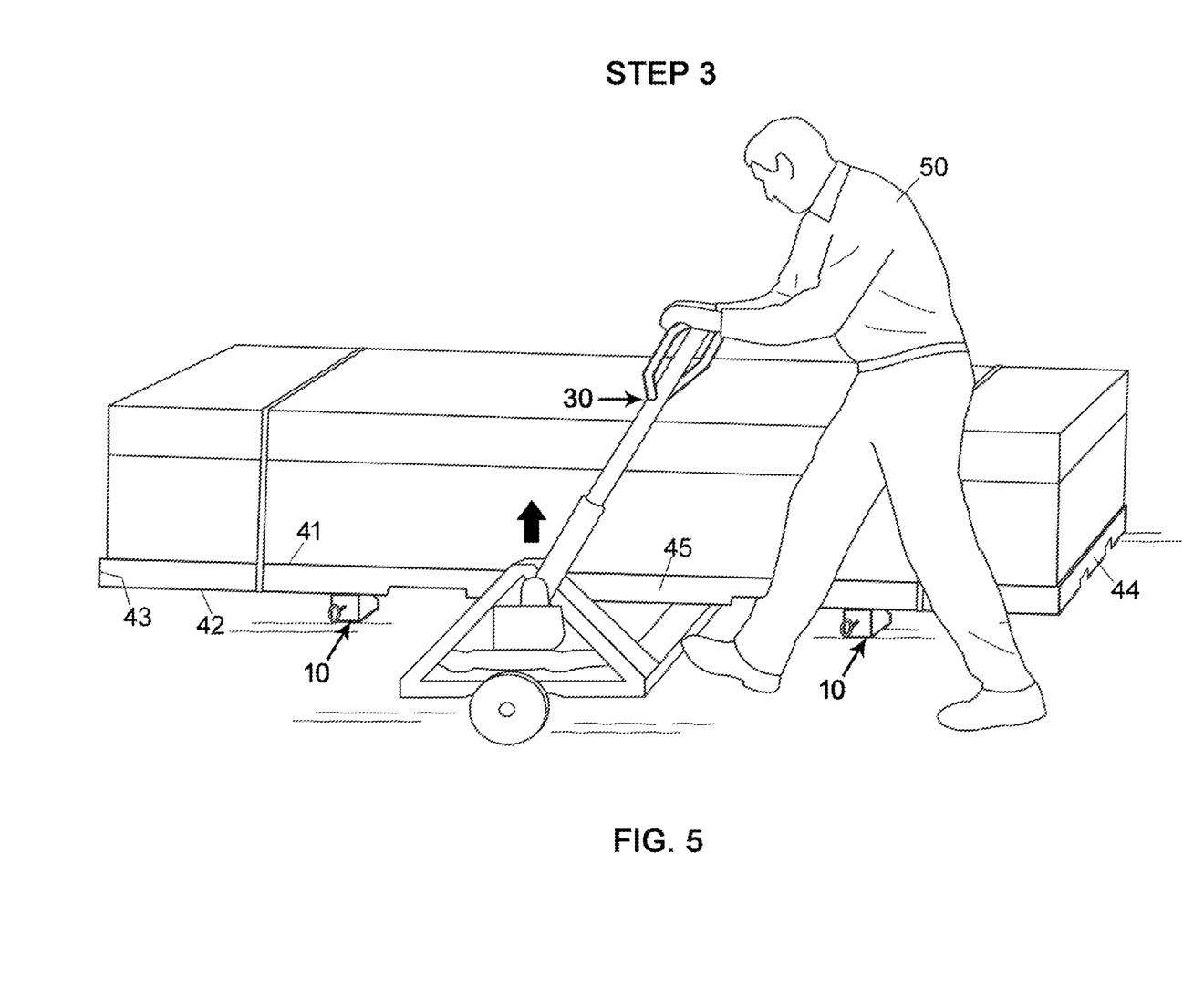
FIG. 5 is an illustration explaining the third step of the defined herein method, showing the end-user moving the pallet jack to the long side of the pallet, and inserting the pallet jack between the two wedges supporting the pallet, and lifting the pallet; the handle of the pallet jack is turned at a right angle to the direction of travel, and the end-user places his foot on the pallet jack to prevent movement of the pallet jack; in accordance with an exemplary embodiment of the present invention.

The function F, requires the end-user 50 to lower the forks 31 of the pallet jack 30, enabling the end-user 50 to move the pallet jack 30 to the long side 45 of the pallet 40.

The function G, requires the end-user 50 to insert the forks 31 of the pallet jack 30 between the wedges 10 and underneath the bottom deckboard 42 of the pallet 40.

The function H, requires the end-user 50 to use the forks 31 of the pallet jack 30 to lift the long side 45 of the pallet 40.

Figure 6:
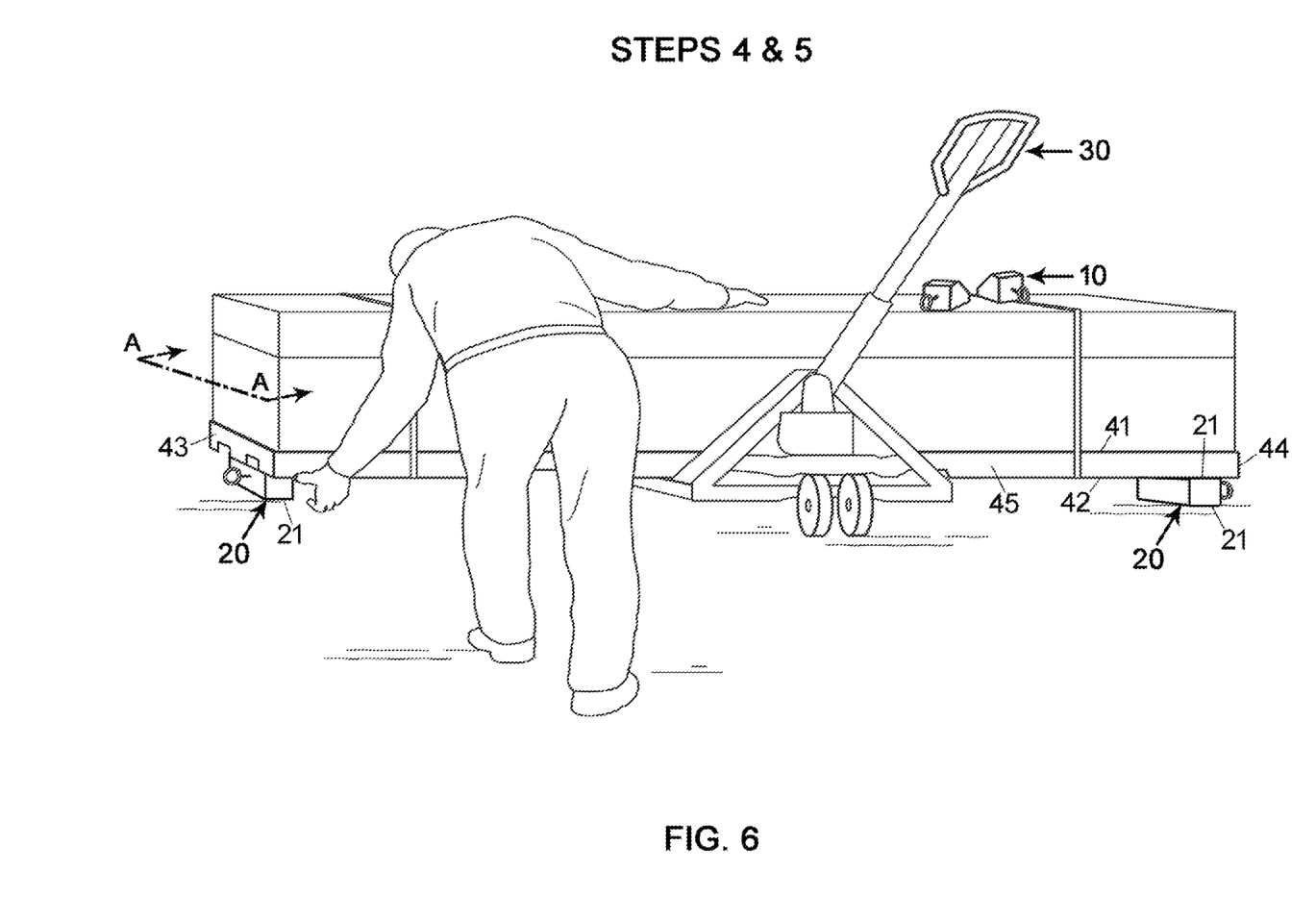
FIG. 6 is an illustration explaining the fourth step and the fifth step of the defined herein method, showing the end-user removing the wedges, and inserting the two blocks on the short side of the pallet and underneath the bottom deckboard; in accordance with an exemplary embodiment of the present invention.

The function I, requires the end-user 50 to remove the two wedges 10, from underneath the pallet 40.

The function J, requires the end-user 50 to provide two blocks 20, wherein each of the two blocks comprises of two side walls 21 and a hook 22. Similar to the hooks 13 attached to the two wedges 10, the hooks attached to two blocks 20 allow the end-user 50 to grab hold of the hooks 22 and retrieve the attached thereto block 20 from underneath the pallet 40.

Figure 7:
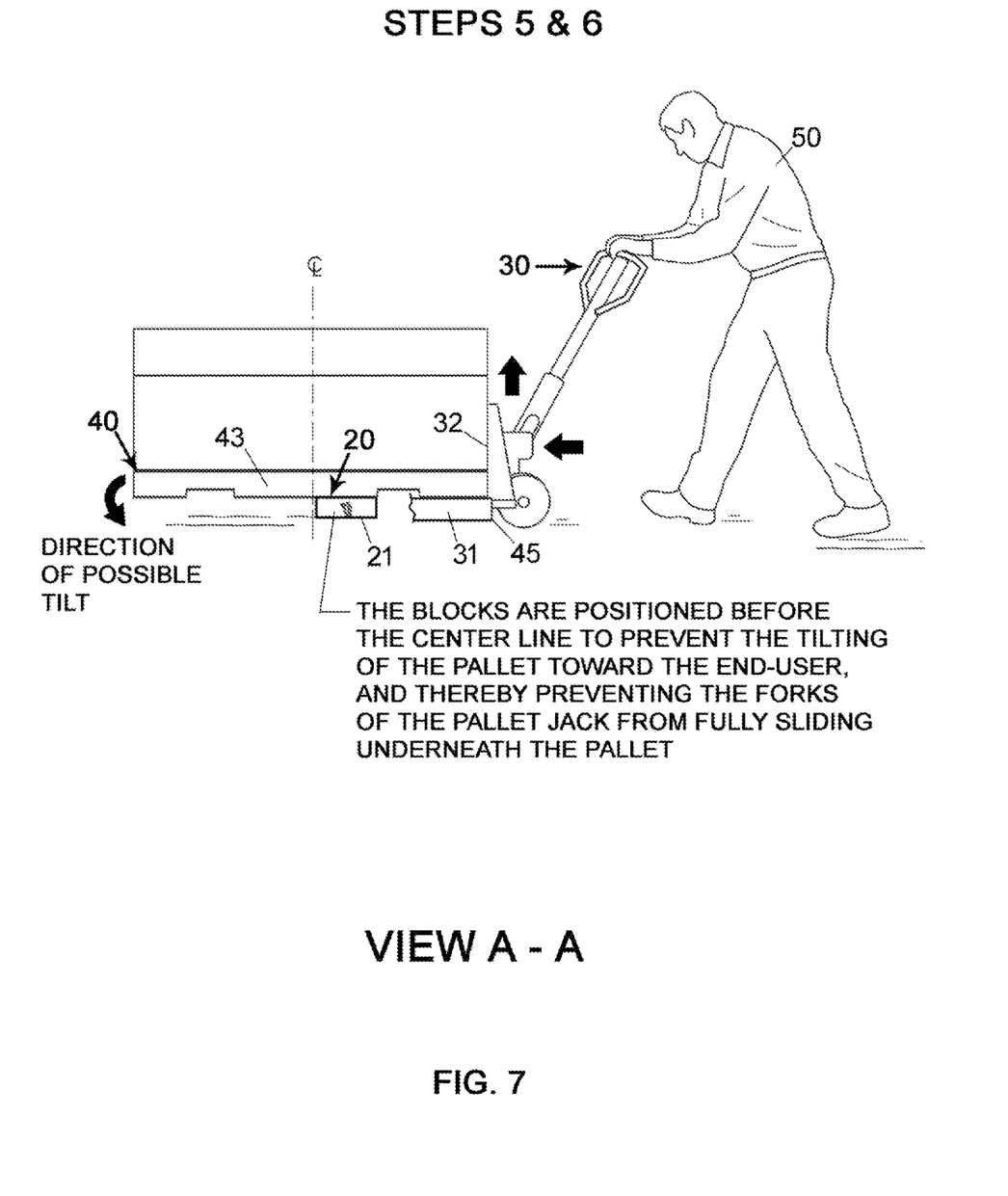
FIG. 7 is an illustration explaining the fifth step and the sixth step of the defined herein method, showing both the disposition and the configuration of the inserted blocks; wherein one of the two blocks is disposed before a center point of the first short side that is closer to the pallet jack, and one of the two blocks is disposed before a center point of the second short side that is closer to the pallet jack; wherein each of the two blocks is configured so that one of the two side walls is touching the ground, and one of the two side walls is touching the bottom deckboard, and the hook of each of the two blocks are easily accessible to the end user; in accordance with an exemplary embodiment of the present invention.

The function K, requires the end-user 50 to insert the two blocks 20 on the short side 43 of the pallet and underneath the bottom deckboard 42, so that one of the two blocks 20 is disposed before a center point of the first short side 43 that is closer to the pallet jack 30, and one of the two blocks 20 is disposed before a center point of the second short side 44, that is closer to the pallet jack 30.

The function L, requires the end-user 50 to configure each of the two blocks 20 so one of the two side walls 21 is touching the ground, and one of the two side walls 21 is touching the bottom deckboard 42, and the hook 22 of each of the two blocks 20 are easily accessible to the end user 50.

The function M, requires the end-user 50 to lower the forks 31 of the pallet jack 30, allowing the end-user 50 to re-insert the forks 31 of the pallet jack 30 in the same position so that a stop plate 32 of the pallet jack 30 makes contact with the long side 45 of the pallet 40. If correctly executed, this function will ensure that the pallet 40, and the load held by the pallet 40, is properly situated, and thereby balanced on the forks 31 of the pallet jack 30.

Figure 8:
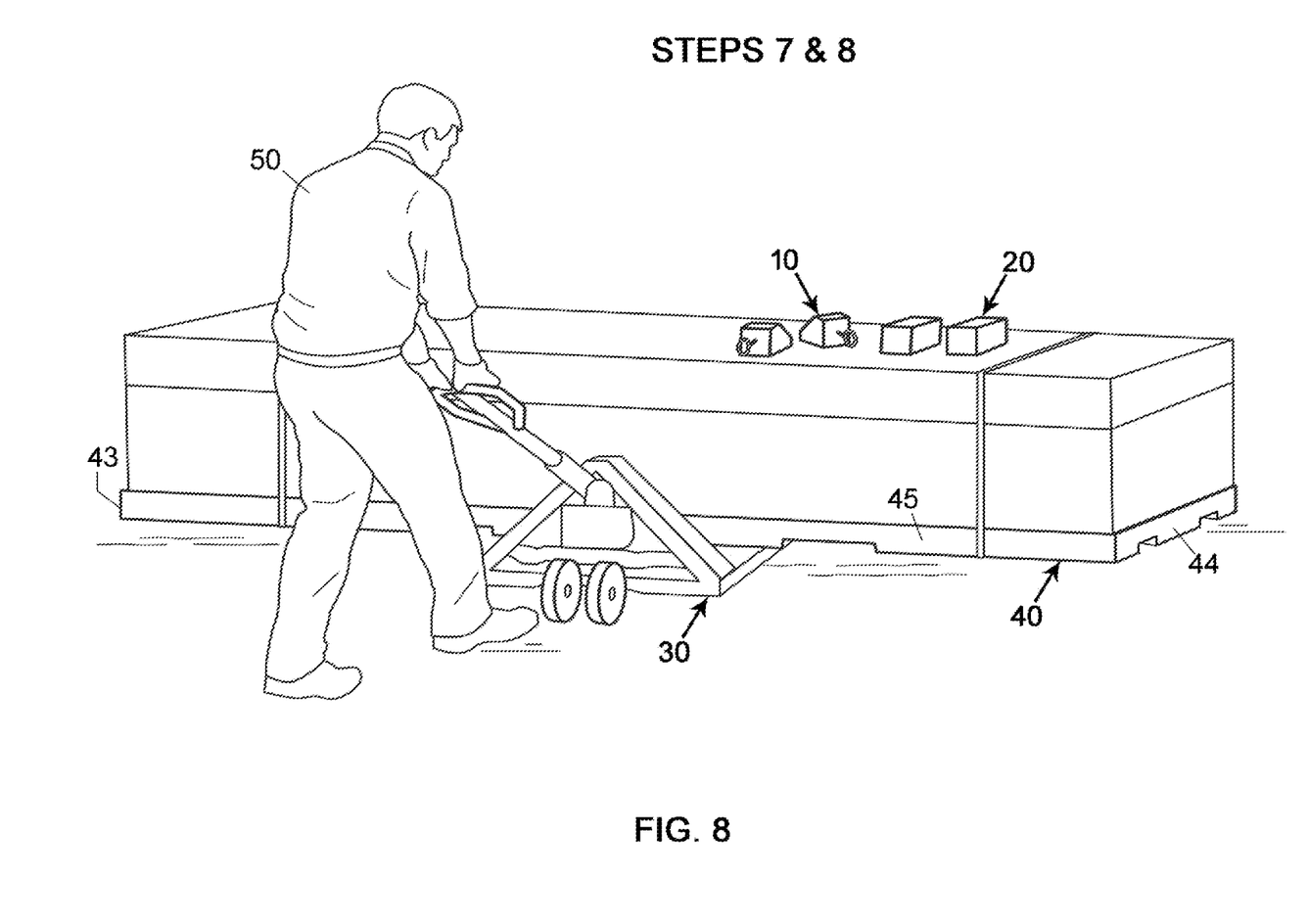
FIG. 8 is an illustration explaining the seventh step and the eighth step of the defined herein method, showing the blocks being removed and placed on the top of the load, the pallet being lifted and moved by the end-used to a designated location; in accordance with an exemplary embodiment of the present invention.

The function N, requires the end-user 50 to use the forks 10 of the pallet jack 30 to lift the pallet 40, high enough to allow the end-user 50 to remove the blocks 20 from underneath the pallet 40, identified here as the Function O.

The function P, requires the end-user 50 to move the pallet 40 to a desired location. The desired location is also the final placement location for the pallet. Here, the end-user will extract the pallet jack from the pallet, and gently place the pallet on the ground. These final steps are defined in functions Q, R, S, T, and U.

Figure 9:
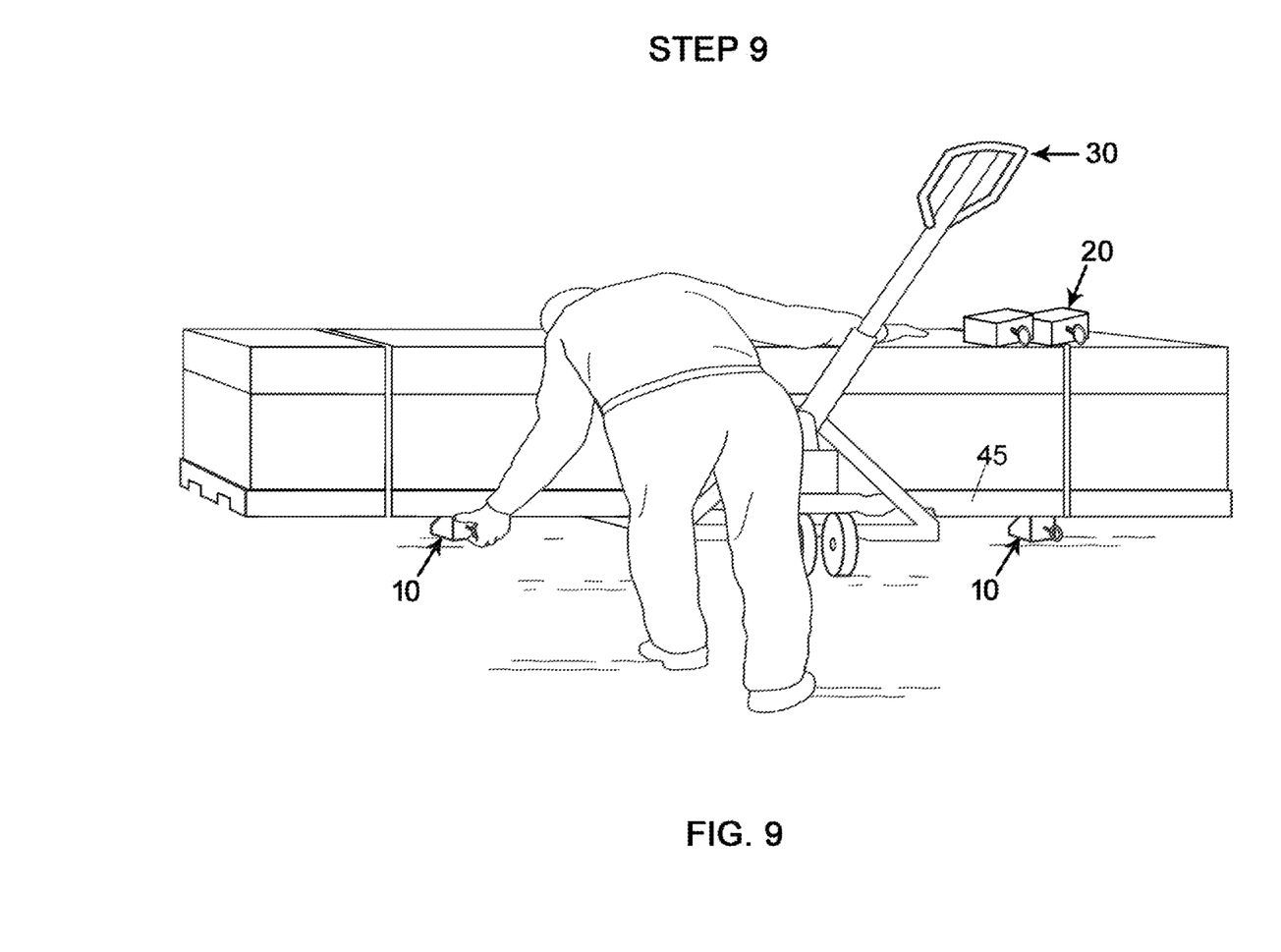
FIG. 9 is an illustration explaining the ninth step of the defined herein method, showing the end-user inserting underneath the bottom deckboard, on the long side of the pallet, two wedges; wherein the one wedge is inserted near the first short side, and the second wedge is inserted near the second short side of the pallet; in accordance with an exemplary embodiment of the present invention.

The function Q, requires the end-user 50 to insert the two wedges 10 on the long side 45 of the pallet 40 and underneath the bottom deckboard 42, so that one of the two wedges 10 is disposed near the first short side 43, and one of the two wedges 10 is disposed near the second short side 44.

Figure 10:
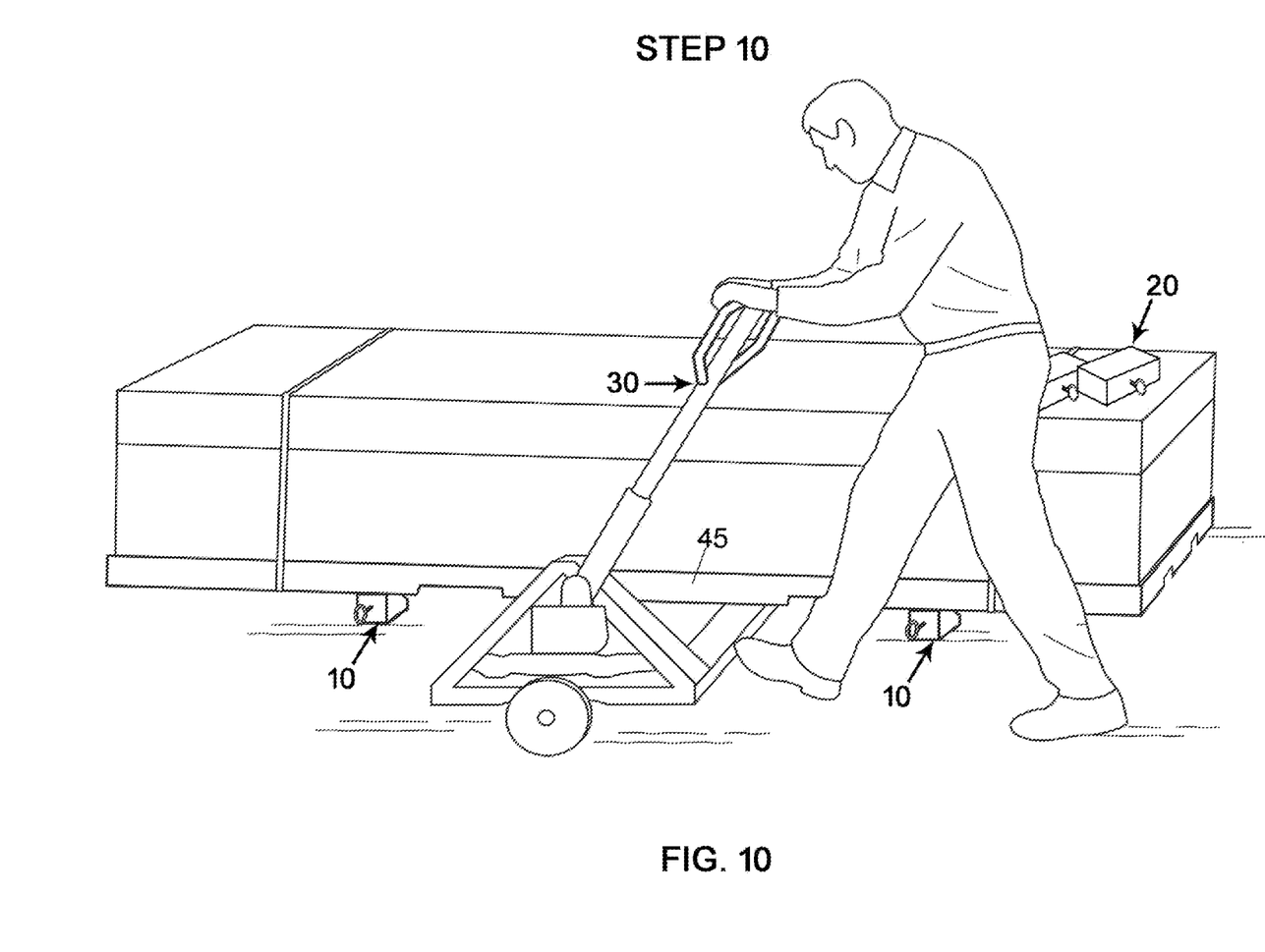
FIG. 10 is an illustration explaining the tenth step of the defined herein method, showing the end-user lowering the pallet jack, and partially extracting the pallet jack, leaving the tips of the pallet jack forks underneath the bottom deckboard; in accordance with an exemplary embodiment of the present invention.

The function R, requires the end-user 50 to lower the forks 31 of the pallet jack 30 and to partially extract the pallet jack 30 so that the forks 31 partially remain underneath the bottom deckboard 42.

Figure 11:
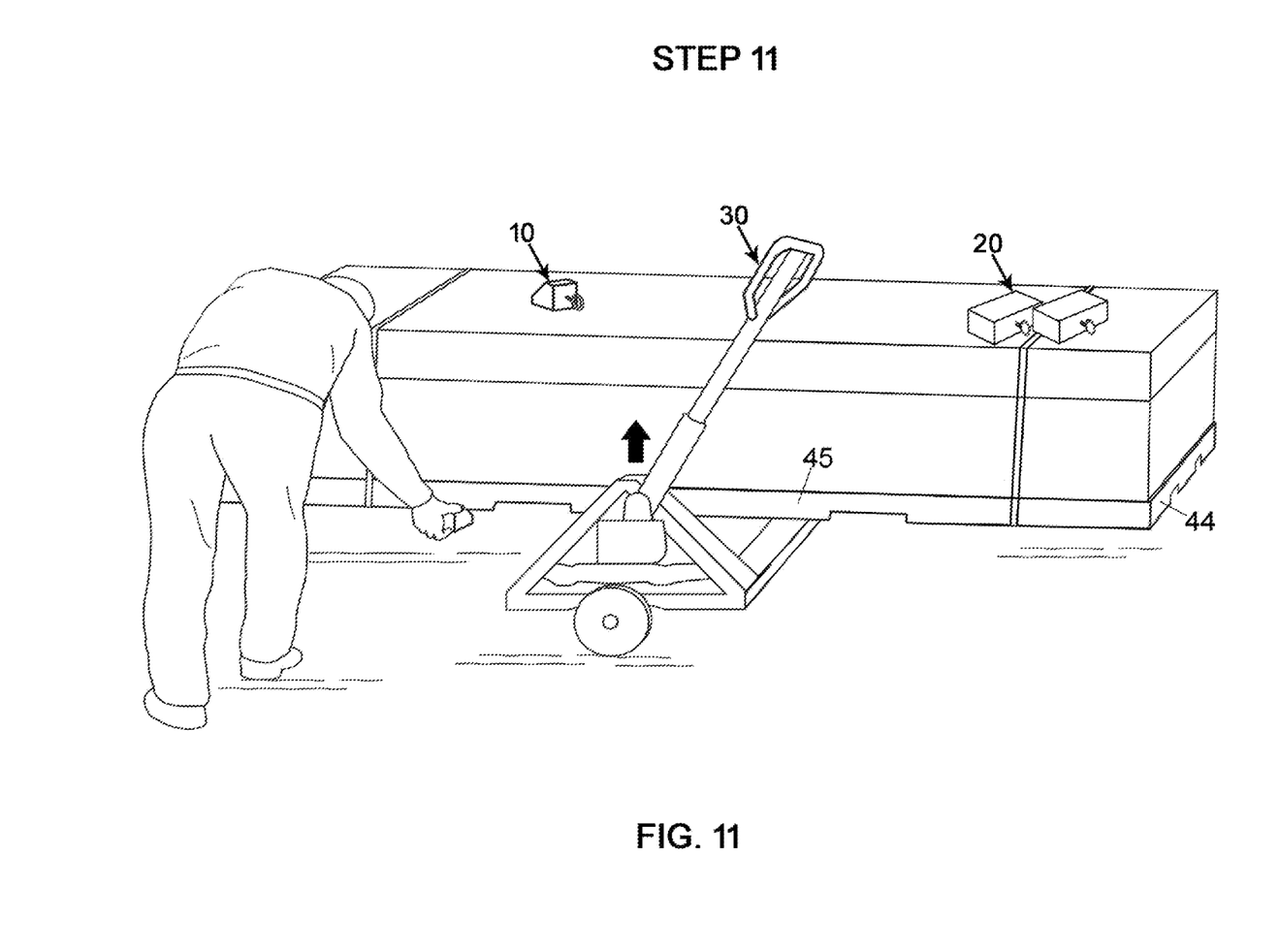
FIG. 11 is an illustration explaining the eleventh step of the defined herein method, showing the end-user lifting the pallet jack, and subsequently removing the wedges from underneath the bottom deckboard; in accordance with an exemplary embodiment of the present invention.
Figure 12:
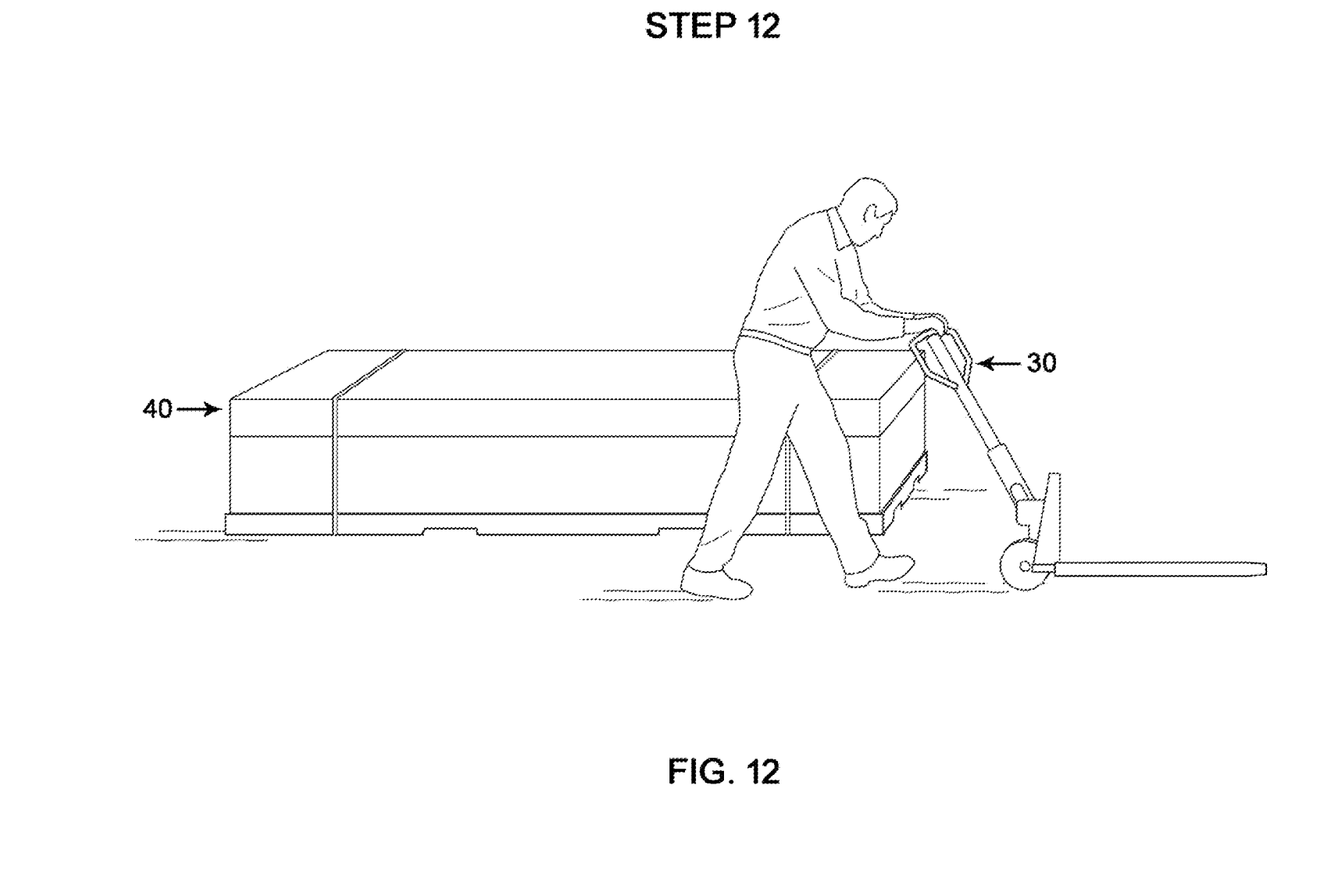
FIG. 12 is an illustration explaining the twelfth, and the final step of the defined herein method, showing the end-user lowering the pallet jack, and removing the pallet jack from underneath the bottom deckboard, thereby completing placement of the pallet in the desired location; in accordance with an exemplary embodiment of the present invention.

The function S, requires the end-user 50, using the forks 31 of the pallet jack, to lift the long side 45 of the pallet 40. The function T, requires the end-user 50 to remove the two wedges 10 from underneath the bottom deckboard 42. And, the function U, requires the end-user 50, to lower the forks 31 of the pallet jack 30 and to remove the pallet jack 30, thereby completing the placement of the pallet in the desired location.

What is claimed is:

1. A method of temporally supporting a pallet, holding a load, to be lifted and moved via a pallet jack, comprising:

A) providing the pallet jack having a stop plate and forks configured to lift or to lower the pallet; wherein the pallet is comprising of a top deckboard, a bottom deckboard, a first short side, a second short side, and a long side;

B) using the forks of the pallet jack to lift the first short side of the pallet;

C) providing two wedges, wherein each of the two wedges comprises of an angled surface, a bottom surface, and a hook;

D) inserting the two wedges on the long side of the pallet and underneath the bottom deckboard, so that one of the two wedges is disposed near the first short side, and one of the two wedges is disposed near the second short side;

E) configuring each of the two wedges so the bottom surface is touching a ground, the angled surface is touching the bottom deckboard, and the hook is easily accessible to an end user;

F) lowering the forks of the pallet jack and moving the pallet jack to the long side of the pallet;

G) inserting the forks of the pallet jack between the wedges;

H) using the forks of the pallet jack to lift the long side of the pallet;

I) removing the two wedges;

J) providing two blocks, wherein each of the two blocks comprises of two side walls and a hook;

K) inserting the two blocks on the short side of the pallet and underneath the bottom deckboard, so that one of the two blocks is disposed before a center point of the first short side that is closer to the pallet jack, and one of the two blocks is disposed before a center point of the second short side that is closer to the pallet jack;

L) configuring each of the two blocks so one of the two side walls is touching the ground, and one of the two side walls is touching the bottom deckboard, and the hook of each of the two blocks are easily accessible to the end user;

M) lowering the forks of the pallet jack and reinserting the forks of the pallet jack in the same position so that a stop plate of the pallet jack makes contact with the long side;

N) using the forks of the pallet jack to lift the pallet;

O) removing the two blocks;

P) moving the pallet to a desired location;

Q) inserting the two wedges on the long side of the pallet and underneath the bottom deckboard, so that one of the two wedges is disposed near the first short side, and one of the two wedges is disposed near the second short side;

R) lowering the forks of the pallet jack and partially extracting the pallet jack so that the forks partially remain underneath the bottom deckboard;

S) using the forks of the pallet jack to lift the long side of the pallet;

T) removing the two wedges; and

U) lowering the forks of the pallet jack and removing the pallet jack;

whereby placement of the pallet in the desired location is completed.

2. The method of temporally supporting a pallet, holding a load to be lifted and moved via a pallet jack of claim 1 wherein:
said pallet is a two way entry reversible type pallet.

3. The method of temporally supporting a pallet, holding a load to be lifted and moved via a pallet jack of claim 1 wherein:
said pallet is a two way entry close boarded no base board type pallet.

4. The method of temporally supporting a pallet, holding a load to be lifted and moved via a pallet jack of claim 1 wherein:
said pallet is a two way entry wing type pallet.

5. The method of temporally supporting a pallet, holding a load to be lifted and moved via a pallet jack of claim 1 wherein:
said pallet is a four way entry close boarded three base type pallet.

6. The method of temporally supporting a pallet, holding a load to be lifted and moved via a pallet jack of claim 1 wherein:
said pallet is a four way entry perimeter base type pallet.

7. The method of temporally supporting a pallet, holding a load to be lifted and moved via a pallet jack of claim 1 wherein:
said pallet is a four way entry wing type pallet.

8. The method of temporally supporting a pallet, holding a load to be lifted and moved via a pallet jack of claim 1 wherein:
said pallet is a four way entry close boarded perimeter base type pallet.

9. The method of temporally supporting a pallet, holding a load to be lifted and moved via a pallet jack of claim 1 wherein:
said pallet is a four way entry open boarded three base type pallet.

10. The method of temporally supporting a pallet, holding a load to be lifted and moved via a pallet jack of claim 1 wherein:
said pallet is a 1200 mm×800 mm European type pallet.

11. The method of temporally supporting a pallet, holding a load to be lifted and moved via a pallet jack of claim 1 wherein:
said pallet is a standard European pallet.

12. The method of temporally supporting a pallet, holding a load to be lifted and moved via a pallet jack of claim 1 wherein:
said pallet is a standard North American pallet.

13. The method of temporally supporting a pallet, holding a load to be lifted and moved via a pallet jack of claim 1 wherein:
said pallet is a standard Australian pallet.

14. The method of temporally supporting a pallet, holding a load to be lifted and moved via a pallet jack of claim 1 wherein:
said pallet is a pallet sanctioned by the International Organization for Standardization.

15. The method of temporally supporting a pallet, holding a load to be lifted and moved via a pallet jack of claim 1 wherein:
said pallet is a pallet sanctioned by the Grocery Manufacturers Association.

16. The method of temporally supporting a pallet, holding a load to be lifted and moved via a pallet jack of claim 1 wherein:
said two wedges are made from a group of materials consisting of wood, plastic, metal, paper, rubber, and recycled materials.

17. The method of temporally supporting a pallet, holding a load to be lifted and moved via a pallet jack of claim 1 wherein:
said two blocks are made from a group of materials consisting of wood, plastic, metal, paper, rubber, and recycled materials.

18. The method of temporally supporting a pallet, holding a load to be lifted and moved via a pallet jack of claim 1 wherein:
said pallet is made from a group of materials consisting of wood, plastic, metal, paper, rubber, and recycled materials.

19. The method of temporally supporting a pallet, holding a load to be lifted and moved via a pallet jack of claim 1 wherein said pallet is selected from a group of pallets consisting of:

A) the first short side, the second short side, and the long side being seven inches tall;

B) the first short side, the second short side, and the long side being six and one half inches tall;

C) the first short side, the second short side, and the long side being six inches tall;

D) the first short side, the second short side, and the long side being five and one half inches tall;

E) the first short side, the second short side, and the long side being five inches tall;

F) the first short side, the second short side, and the long side being four and one half inches tall;

G) the first short side, the second short side, and the long side being four inches tall;

H) the first short side, the second short side, and the long side being three and one half inches tall;

I) the first short side, the second short side, and the long side being three inches tall;

J) the first short side, the second short side, and the long side being two and one half inches tall;

K) the first short side, the second short side, and the long side being two inches tall.

\* \* \* \* \*